(12) United States Patent
Lee et al.

(10) Patent No.: US 12,612,116 B2
(45) Date of Patent: Apr. 28, 2026

(54) CONNECTING JOINT AND ASSEMBLY METHOD THEREOF

(71) Applicants: Hyundai Motor Company, Seoul (KR); Kia Corporation, Seoul (KR)

(72) Inventors: Je Joon Lee, Hwaseong-si (KR); Dong Ho Kang, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 380 days.

(21) Appl. No.: 18/346,571

(22) Filed: Jul. 3, 2023

(65) Prior Publication Data

US 2024/0326927 A1 Oct. 3, 2024

(30) Foreign Application Priority Data

Apr. 3, 2023 (KR) ........................ 10-2023-0043644

(51) Int. Cl.
 B62D 27/02 (2006.01)
 F16B 5/08 (2006.01)
(52) U.S. Cl.
 CPC .............. B62D 27/023 (2013.01); F16B 5/08 (2013.01)
(58) Field of Classification Search
 CPC .... B62D 27/023; B62D 23/005; B62D 24/00; B62D 63/025

USPC ......... 296/29, 30, 205, 203.1–4; 403/53, 54, 403/119, 169–171, 176; 29/897, 897.2
See application file for complete search history.

(56) References Cited

U.S. PATENT DOCUMENTS

| | | | | |
|---|---|---|---|---|
| 7,322,106 B2 * | 1/2008 | Marando | .............. | B22D 19/045 |
| | | | | 29/897 |
| 11,933,336 B2 * | 3/2024 | Suzuki | .................... | F16B 12/50 |
| 2019/0106152 A1 | 4/2019 | Choi et al. | | |

FOREIGN PATENT DOCUMENTS

| | | | |
|---|---|---|---|
| DE | DD-154286 A1 * | 3/1982 | |
| KR | 102383247 B1 | 4/2022 | |

OTHER PUBLICATIONS

DD154286 TEXT (Year: 1982).*

* cited by examiner

*Primary Examiner* — Jacob S. Scott
(74) *Attorney, Agent, or Firm* — Slater Matsil, LLP

(57) ABSTRACT

An embodiment connecting joint includes a base panel and a plurality of sub-panels sequentially connected to sides of the base panel, respectively, the sub-panels configured to be inwardly bent with reference to the base panel to be assembled, wherein, in an assembled state, the sub-panels are configured to hold a connecting member for connection to the sub-panels.

20 Claims, 7 Drawing Sheets

CONNECTING JOINT AND ASSEMBLY METHOD THEREOF

CROSS-REFERENCE TO RELATED APPLICATIONS

This application claims the benefit of Korean Patent Application No. 10-2023-0043644, filed on Apr. 3, 2023, which application is hereby incorporated herein by reference.

TECHNICAL FIELD

The present invention relates to a connecting joint and an assembly method thereof.

BACKGROUND

A purpose-built vehicle (PBV) is constituted by a life module configured to form passenger and trunk compartments having various forms according to market demand and a drive module associated with substantial driving of a vehicle. Various kinds of vehicles may be easily manufactured through a combination of various life modules according to various demands with a common drive module. In this regard, it may be possible to very effectively cope with the current market trend of small quantity batch production.

Recently, a vehicle, to which a body frame meeting various purposes of the vehicle is applied, has been developed. For example, a vehicle, to which a box type body frame enhancing utility of an inner space is applied, has been developed. In the case of the vehicle to which the box type body frame is applied, a glass area is enlarged, and an overall height is increased, as compared to existing traditional vehicles. For this reason, securing of stiffness of each corner part in the vehicle is important.

In a general vehicle body structure, there are drawbacks in that investment into large-scale facilities such as a press plant, a vehicle body welding plant, a paint plant, etc. is needed, and freedom of design is low because a vehicle body is manufactured by machining parts through pressing using a mold and welding the machined parts.

In particular, in the case of an existing vehicle body, many design changes are required for small quantity batch production. As a result, there is a problem in that manufacturing costs are increased because the number of molds for small quantity batch production is greatly increased.

In order to appropriately cope with needs of market environments and consumers, which have rapidly changed in recent years, it is necessary to simplify vehicle manufacture and to shorten the vehicle development cycle. To this end, a vehicle body structure capable of enhancing assemblability thereof in a smart factory environment while coping with various designs is needed.

Meanwhile, in accordance with recent advances in autonomous driving technologies, a vehicle capable of transporting a freight under the condition that the driver does not ride in the vehicle is required. In addition, there is a requirement for a vehicle in which certain vehicle parts are modularized, and the modularized vehicle parts are manufacturable in an eco-friendly smart factory where a vehicle body is assembled only through mechanical assembly such as bolting, without requiring a press process, a vehicle body welding process, and a painting process.

Meanwhile, in a vehicle body having scalability according to small quantity batch production, there is a problem in that freedom of design is limited because, when a vehicle body structure is changed, additional development or design of a joint is required. To this end, a connecting joint capable of coping with various scalabilities of the vehicle body is needed.

The above matters disclosed in this section are merely for enhancement of understanding of the general background of embodiments of the invention and should not be taken as an acknowledgement or any form of suggestion that the matters form the related art already known to a person skilled in the art.

SUMMARY

The present invention relates to a connecting joint and an assembly method thereof. Particular embodiments relate to a connecting joint and an assembly method thereof which are capable of achieving an enhancement in freedom of design by assembling a plurality of sub-panels with reference to a base panel in a structure of the connecting joint designed in the form of a developed figure.

Therefore, embodiments of the present invention have been made in view of problems in the art, and an embodiment of the present invention provides a connecting joint and an assembly method thereof which are capable of achieving an enhancement in freedom of design by assembling a plurality of sub-panels with reference to a base panel in a structure of the connecting joint designed in the form of a developed figure.

Embodiments of the present invention are not limited to the above-described embodiments, and other embodiments of the present invention not yet described will be more clearly understood by those skilled in the art from the following detailed description.

An embodiment of the present invention provides a connecting joint including a base panel and a plurality of sub-panels sequentially connected to sides of the base panel, respectively, and inwardly bent with reference to the base panel, to be assembled, the plurality of sub-panels enabling, in an assembled state thereof, a connecting member to be held thereon and to be fixed thereto.

Bending lines may be formed at points where adjacent ones of the sub-panels are interconnected and at points where the sub-panels are connected to the base panel. The plurality of sub-panels may be bent along the bending lines, so as to be assembled.

A plurality of through holes may be perforated at each of the bending lines, and the plurality of sub-panels may be bent along the plurality of through holes of the bending lines, so as to be assembled.

The plurality of sub-panels may be tack-welded at corner points where adjacent ones of sub-panels abut each other in a state of being inwardly bent with reference to the base panel, so as to be assembled.

A plurality of connecting members may be held on the plurality of sub-panels in multi-axial directions in an assembled state of the plurality of sub-panels and may extend in a longitudinal direction, a width direction, and a vertical direction of a vehicle, respectively.

When the plurality of sub-panels is assembled and the plurality of connecting members is held on the plurality of sub-panels, ends of the connecting members may be interconnected while surface-contacting each other.

When the plurality of sub-panels is assembled and the plurality of connecting members is held on the plurality of sub-panels, each of the connecting members may be coupled to corresponding ones of the sub-panels through welding at points where the connecting member contacts the corresponding sub-panels, so as to be fixed.

The connecting joint may further include a joint cover configured to cover the plurality of sub-panels and the plurality of connecting members and formed with bending lines. The joint cover may be bent along the bending lines.

The connecting joint may further include an opening opened at a side thereof in an assembled state of the plurality of sub-panels. The plurality of connecting members may be held to close the opening.

When the plurality of sub-panels is assembled and the connecting member is held on the plurality of sub-panels, a side surface of the connecting member may be supported by at least one of the sub-panels.

In accordance with another embodiment of the present invention, there is provided an assembly method of a connecting joint including a base panel and a plurality of sub-panels sequentially connected to sides of the base panel, respectively, the assembly method including assembling the plurality of sub-panels by inwardly bending the plurality of sub-panels with reference to the base panel, holding a connecting member on the plurality of sub-panels in an assembled state of the plurality of sub-panels, and fixing the connecting member at points where the connecting member contacts the sub-panels in a held state of the connecting member.

Assembling the plurality of sub-panels may include tack-welding the plurality of sub-panels at corner points where adjacent ones of the sub-panels abut each other, in an inwardly bent state of the plurality of sub-panels with reference to the base panel, thereby assembling the plurality of sub-panels.

Holding a connecting member may include holding a plurality of connecting members on the plurality of sub-panels in multi-axial directions in an assembled state of the plurality of sub-panels and interconnecting ends of the connecting members while bringing the ends of the connecting members into surface-contact with one another.

Holding the connecting member may include forming an opening opened at one side thereof in an assembled state of the plurality of sub-panels and holding the plurality of connecting members to close the opening.

Fixing the connecting member at points where the connecting member contacts the sub-panels may include coupling the connecting member to the sub-panels, through welding, at the points where the connecting member contacts the sub-panels, thereby fixing the connecting member.

BRIEF DESCRIPTION OF THE DRAWINGS

The above and other objects, features, and other advantages of embodiments of the present invention will be more clearly understood from the following detailed description taken in conjunction with the accompanying drawings, in which.

DETAILED DESCRIPTION OF ILLUSTRATIVE EMBODIMENTS

Figure 1:
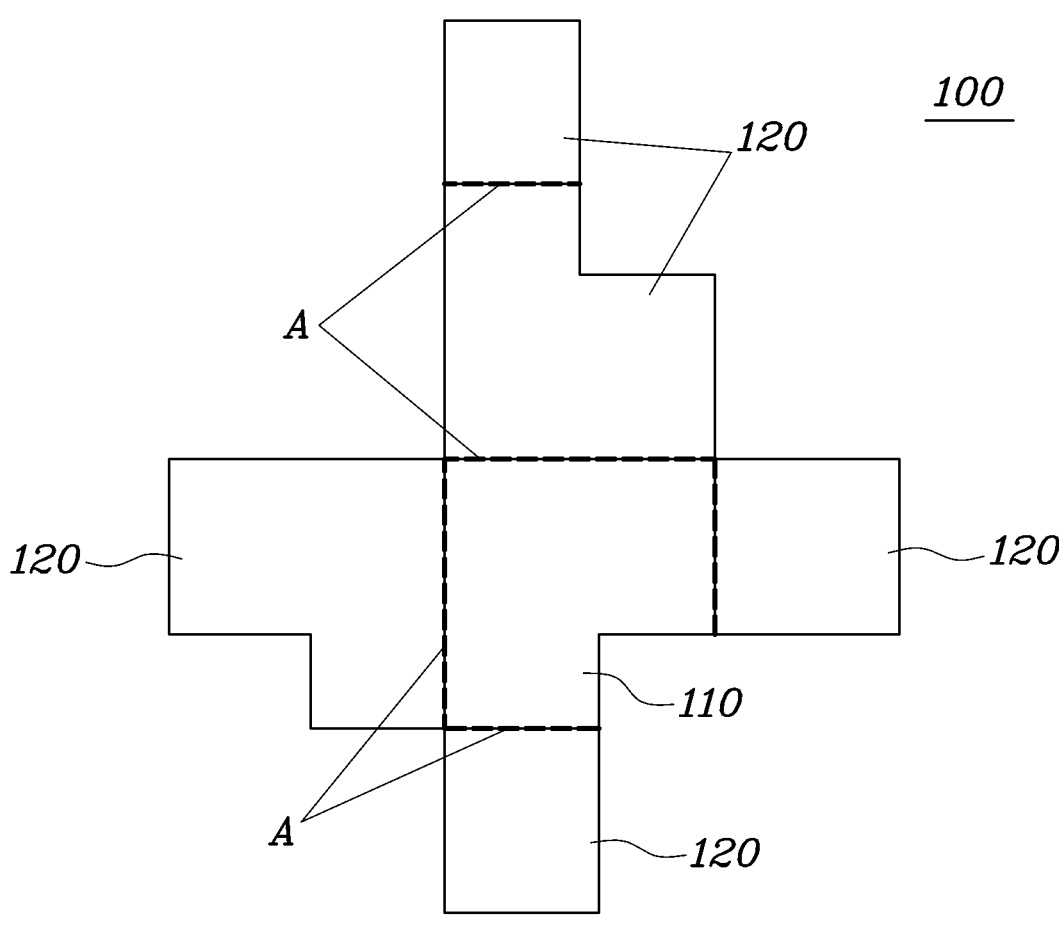
FIG. 1 is a view showing a developed figure of a connecting joint according to an embodiment of the present invention.

Hereinafter, preferred embodiments of the present invention will be described in detail with reference to the accompanying drawings, and the same or similar elements are designated by the same reference numerals throughout the drawings and redundant description thereof will be omitted.

The suffixes "module" and "unit" of elements herein are used for convenience of description and thus can be used interchangeably and do not have any distinguishable meanings or functions.

In describing embodiments of the present invention, moreover, a detailed description will be omitted when a specific description of publicly known technologies to which embodiments of the invention pertain is judged to obscure the gist of the embodiments of the present invention. In addition, it should be noted that the accompanying drawings are merely illustrated to easily explain the spirit of embodiments of the invention, and therefore, should not be construed as limiting the spirit of embodiments of the invention to the accompanying drawings. On the contrary, embodiments of the invention are to cover all modifications, equivalents, and alternatives falling within the spirit and scope of the embodiments of the invention as defined by the claims. Although terms including an ordinal number, such as first or second, may be used to describe a variety of constituent elements, the constituent elements are not limited to the terms, and the terms are used only for the purpose of discriminating one constituent element from other constituent elements.

It will be understood that, when one element is referred to as being "connected to" or "coupled to" another element, one element may be "connected to" or "coupled to" another element via a further element although one element may be directly connected to or directly coupled to another element. On the other hand, it will be understood that, when an element is referred to as being "directly connected to" or "directly coupled to" another element, there is no intervening element present.

As used in the description of embodiments of the invention and the appended claims, the singular forms are intended to include the plural forms as well, unless context clearly indicates otherwise.

It will be further understood that the terms "comprises" and/or "comprising" or "includes" and/or "including" when used in this specification specify the presence of stated features, regions, integers, steps, operations, elements, and/or combinations thereof, but do not preclude the presence or addition of one or more other features, regions, integers, steps, operations, elements, components, and/or combinations thereof.

In accordance with an embodiment of the present invention, there is a proposal in which a plurality of sub-panels is assembled with reference to a base panel in a structure of a connecting joint designed in the form of a developed figure, thereby achieving an enhancement in freedom of design.

The connecting joint may be designed as a sheet having the form of a hexahedral figure. As the developed figure is assembled, the developed figure forms the connecting joint. Connection panels may be assembled in an assembled state of the connecting joint.

FIG. 1 is a view showing a developed figure of the connecting joint according to an embodiment of the present invention. FIG. 1 mainly shows constituent elements associated with this embodiment and, as such, an increased or decreased number of constituent elements may be included in a connecting joint implemented in a practical case.

Referring to FIG. 1, the connecting joint according to an embodiment of the present invention, which is designated by reference numeral "100," may include a base panel 110 and a plurality of sub-panels 120.

As shown in FIG. 1, the base panel 110 is a panel as an assembly reference of the connecting joint 100, and the plurality of sub-panels 120 may be bent toward the base panel 110, as will be described later. The plurality of sub-panels 120 may be provided around the base panel 110 and may be connected to the base panel 110.

The sub-panels 120 may be sequentially connected to respective sides of the base panel 110. The form in which the plurality of sub-panels 120 is interconnected with reference to the base panel 110 may be diversely designed in accordance with connection of a connecting member 200 in an assembled state of the connecting joint 100. The plurality of sub-panels 120 is assembled in a state of being inwardly bent with reference to the base panel 110 and, as such, there is an advantage in that design change is very free.

In addition, bending lines A may be formed at a point where adjacent sub-panels 120 are interconnected and a point where a sub-panel 120 is connected to the base panel 110. As the plurality of sub-panels 120 is bent along the bending lines A, bending difficulty may be reduced and, as such, production of the connecting joint 100 may be very easy.

In this case, a plurality of through holes is perforated at each bending line A, and the plurality of through holes is spaced apart from one another by a predetermined distance, and, as such, force required in bending may be greatly reduced. Accordingly, bending of the plurality of sub-panels 120 may be easily achieved.

Figure 2:
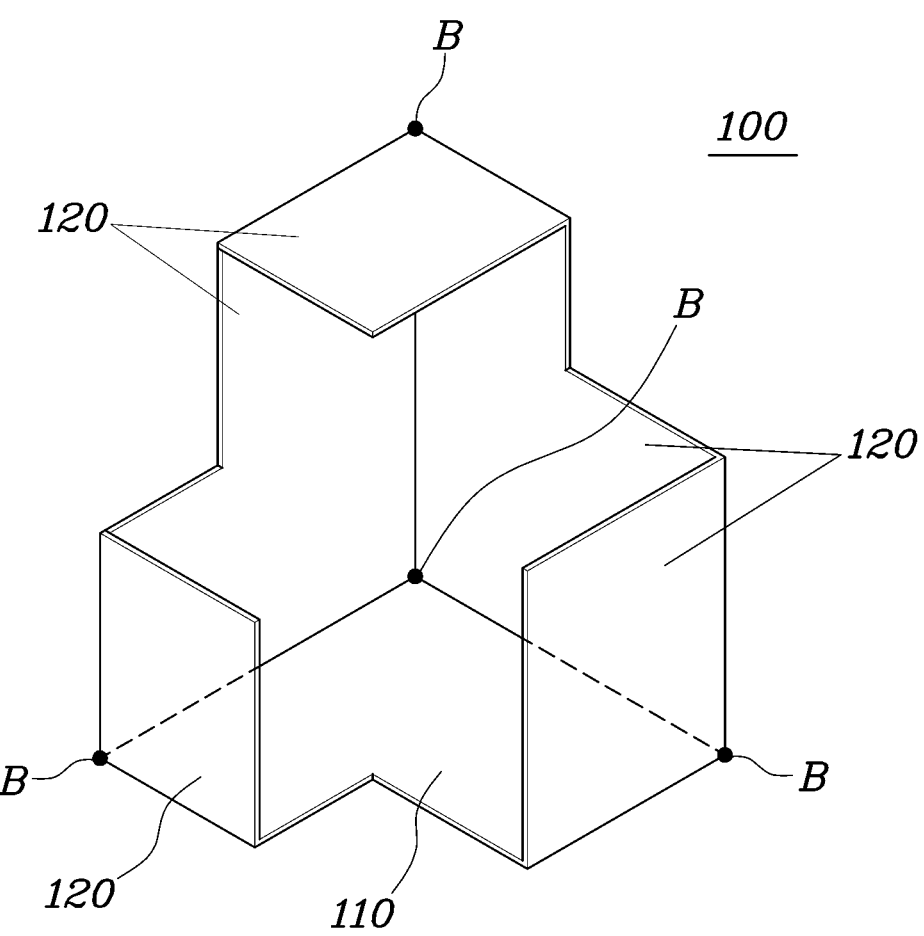
FIG. 2 is a view showing the connecting joint in which a plurality of sub-panels is assembled in a bent state in accordance with an embodiment of the present invention.

FIG. 2 is a view showing the connecting joint 100 in which the plurality of sub-panels 120 is assembled in a bent state in accordance with an embodiment of the present invention.

Referring to FIG. 2, it may be seen that the plurality of sub-panels 120 is assembled in a bent state. The plurality of sub-panels 120 may be assembled as the sub-panels 120 are inwardly bent and are then tack-welded at corner points B where adjacent ones of the sub-panels 120 abut each other. The base panel 110 and the plurality of sub-panels 120 may maintain shapes thereof through tack-welding as described above, and the connecting member 200 may be supported and held by the sub-panels 120 in state in which the shape of the connecting joint 100 is maintained.

Figure 3:
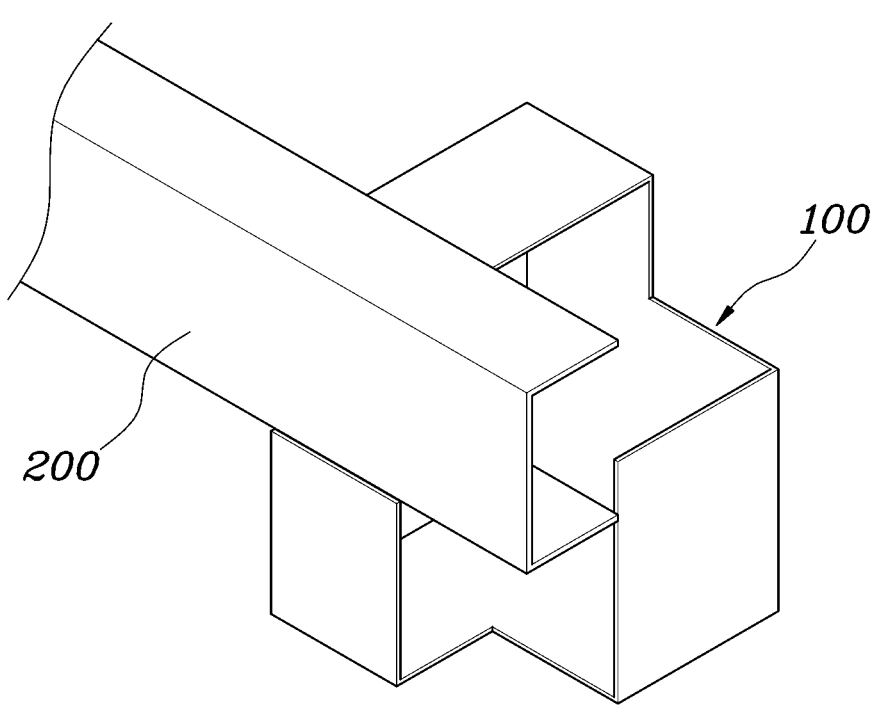
FIG. 3 is a view showing a state in which a connecting member is held on the connecting joint according to an embodiment of the present invention.

FIG. 3 is a view showing a state in which the connecting member 200 is held on the connecting joint 100 according to an embodiment of the present invention. In addition, FIG. 4 is a view showing a state in which ends of connecting members 200 according to an embodiment of the present invention are interconnected while surface-contacting each other.

Figure 4:
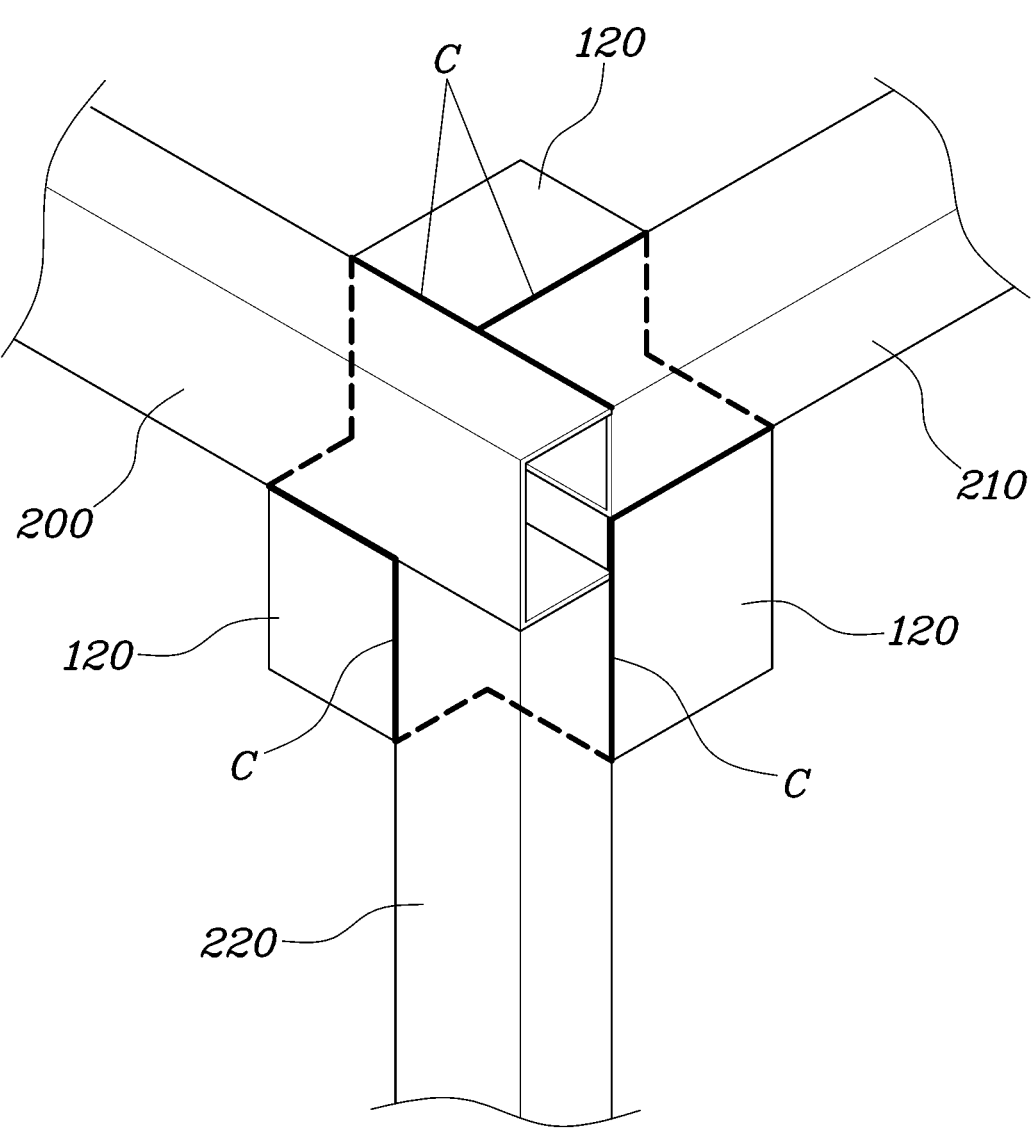
FIG. 4 is a view showing a state in which ends of connecting members according to an embodiment of the present invention are interconnected while surface-contacting each other.

Referring to FIGS. 3 and 4, a plurality of connecting members 200, 210, and 220 may be held on the assembled connecting joint 100, so as to be fixed. The plurality of connecting members 200, 210, and 220 may be held on the connecting joint 100 in multi-axial directions, and may extend in a longitudinal direction, a width direction, and a vertical direction of a vehicle, respectively. Here, when the plurality of sub-panels 120 is assembled and the plurality of connecting members 200, 210, and 220 is held, ends of the connecting members 200, 210, and 220 may be interconnected while surface-contacting each other. The end surface-contact connection structure as described above may form a load path against external collision of the vehicle, thereby increasing overall stiffness. Hereinafter, the connecting members 200, 210, and 220 may also be simply referred to as "connecting members 200."

In this case, stiffness of the connecting joint 100 is proportional to the size of the cross-section of the connecting joint 100 between the connecting members 200, due to characteristics of the connecting joint 100. In the case of the connecting joint 100 according to an embodiment of the present invention, the connecting joint 100 forms a wedge-shaped cross-section by virtue of characteristics of a hexahedral structure thereof when each connecting member 200 is coupled to the connecting joint 100 and, as such, locally forms a rigid structure, and change of a developed figure thereof according to the position thereof holding the connecting member 200 is free in terms of design. Accordingly, it may be possible to adjust local stiffness through determination of the size of the cross-section and, as such, to increase strength of the overall structure.

In addition, at a point C of FIG. 4, a welded state of each connecting member 200 to a corresponding one of the sub-panels 120 at a point where the connecting member 200 contacts the corresponding sub-panel 120 may be identified. In more detail, the connecting member 200 may be connected to the sub-panel 120 through $CO_2$ welding. In addition, the connecting member 200 disposed at a left side with reference to FIG. 4, the connecting member 210 disposed at a right side with reference to FIG. 4, and the connecting member 220 disposed at a lower side with reference to FIG. 4 form intersecting structures at respective ends thereof and, as such, a load applied to one connecting member 200 may be transmitted to other connecting members 200, for example, the connecting members 210 and 220. Accordingly, a rigid structure may be formed. When one connecting member 200 is held on the plurality of assembled sub-panels 120, a side surface of the connecting member 200 may be supported by at least one sub-panel 120. The number of sub-panels 120 supporting the connecting member 200 may be freely varied in accordance with an assembly shape of the connecting joint 100.

In addition, the connecting joint 100 may be formed with an opening opened at sides thereof in an assembled state of the plurality of sub-panels 120. In this case, the plurality of connecting members 200, 210, and 220 may be held on the connecting joint 100 while closing the opening of the connecting joint 100. In this state, the plurality of connecting members 200, 210, and 220 may be coupled to the sub-panels 120 through welding and, as such, may form closed cross-sections. Thus, an enhancement in scalability may be achieved through the structure in which the opening is covered at sides thereof by corresponding surfaces of the plurality of connecting members 200, 210, and 220.

Figure 5:
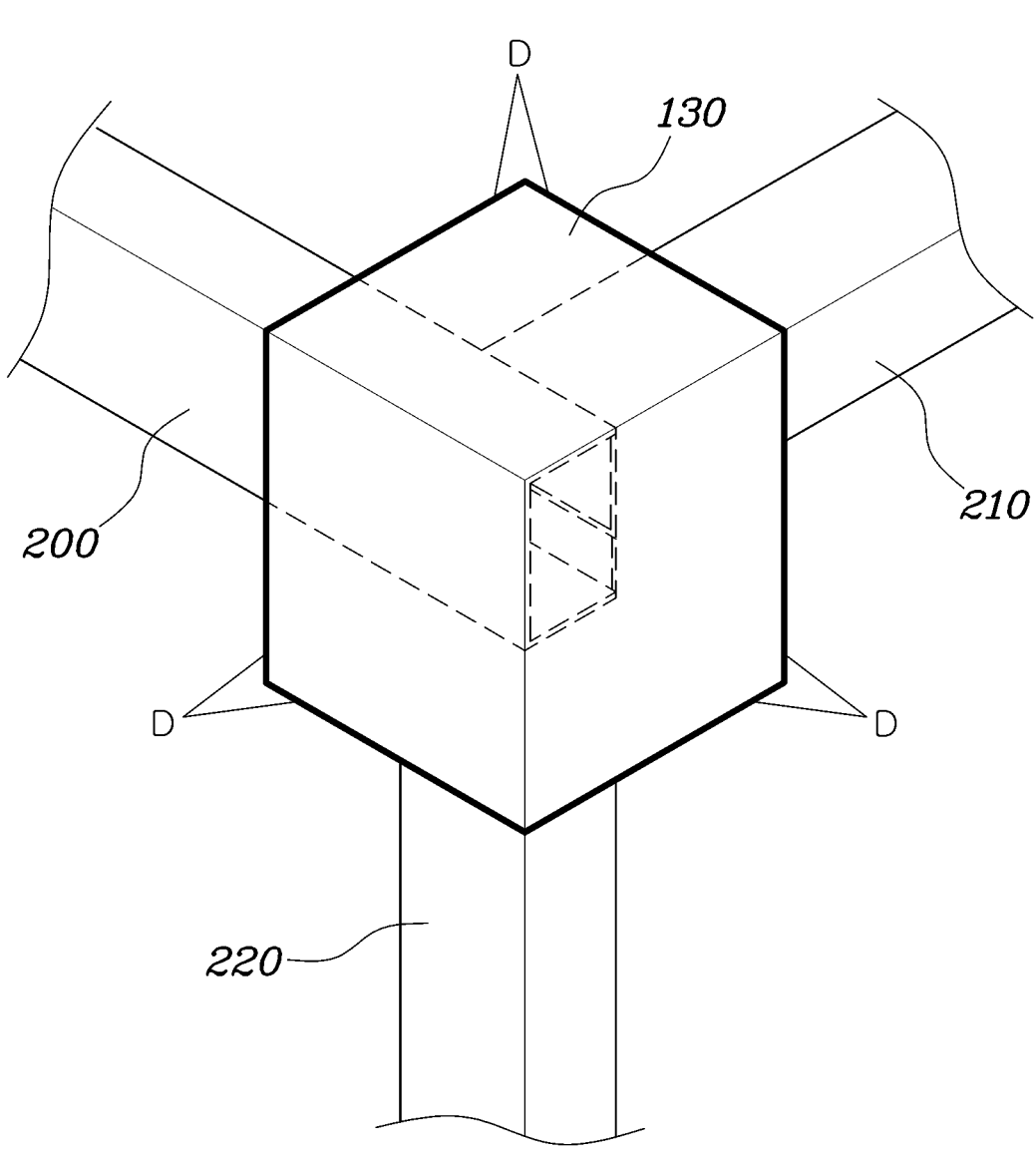
FIG. 5 is a view showing a joint cover configured to cover the plurality of sub-panels and a plurality of connecting members in accordance with an embodiment of the present invention.
Figure 6:
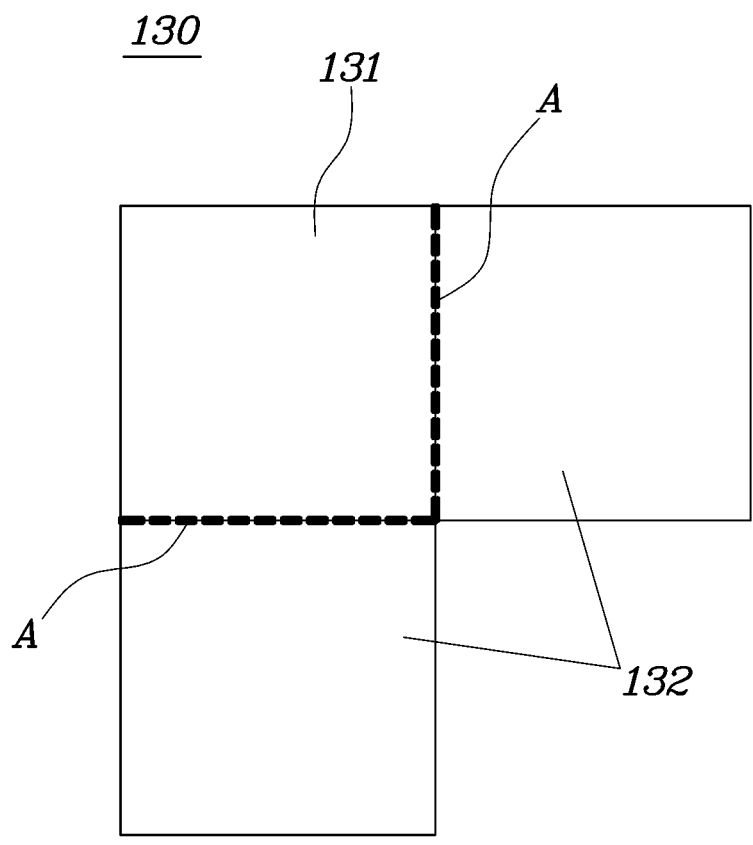
FIG. 6 is a view showing a developed figure of the joint cover according to an embodiment of the present invention.

FIG. 5 is a view showing a joint cover 130 configured to cover the plurality of sub-panels 120 and the plurality of connecting members 200, 210, and 220 in accordance with an embodiment of the present invention. In addition, FIG. 6 is a view showing a developed figure of the joint cover 130 according to an embodiment of the present invention.

Referring to FIG. 5, the joint cover 130 can be welded along edge D. And the joint cover 130 is opened at one side thereof and, as such, may cover the plurality of sub-panels 120 and the plurality of connecting members 200, 210, and 220. The joint cover 130 may completely cover welded portions of the sub-panels 120 and the connecting members 200 and, as such, may form a watertight structure. In this case, bending lines A may be formed at the joint cover 130, similarly to the sub-panels 120. As sub-panels 132 are bent along the bending lines A with reference to a base panel 131, the joint cover 130 may be assembled.

Hereinafter, a method of assembling the connecting joint 100 having the above-described configuration in accordance with an embodiment of the present invention will be described with reference to FIG. 7.

Figure 7:
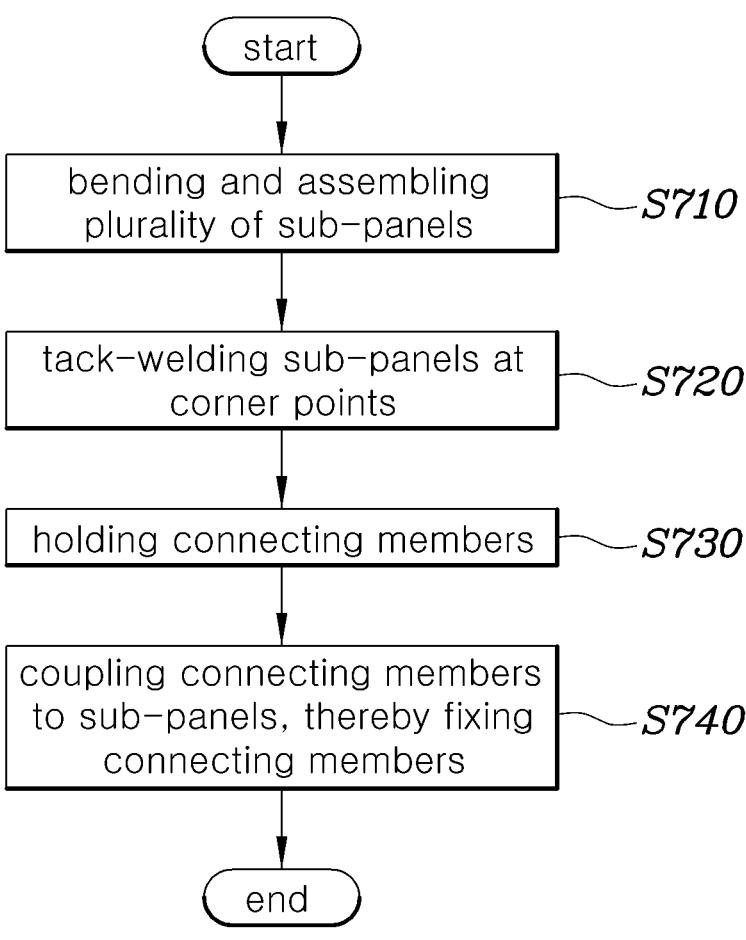
FIG. 7 is a flowchart showing an assembly method of the connecting joint according to an embodiment of the present invention.

FIG. 7 is a flowchart showing the assembly method of the connecting joint 100 according to an embodiment of the present invention.

Referring to FIG. 7, the plurality of sub-panels 120 may be inwardly bent with reference to the base panel 110, so as to be assembled (S710). Thereafter, in the assembled state of the plurality of sub-panels 120, adjacent ones of the sub-panels 120 may be tack-welded at corner points where the adjacent sub-panels abut each other, so as to be assembled (S720). After the sub-panels 120 are assembled through tack-welding at the corner points, the plurality of connecting members 200, 210, and 220 may be held on the connecting joint 100 (S730). In a state in which the plurality of connecting members 200, 210, and 220 is held on the connecting joint 100, the plurality of connecting members 200, 210, and 220 may be coupled to the plurality of sub-panels 120 and, as such, may be fixed (S740).

In accordance with the above-described embodiments of the present invention, in the structure of the connecting joint 100 designed in the form of a developed figure, an enhancement in design freedom may be achieved as the plurality of sub-panels 120 is assembled with reference to the base panel 110. In addition, the connecting joint 100 is assembled in a bending manner, differently from a conventional mold type connecting joint. Accordingly, inventory storage costs and transportation costs may be reduced and, as such, total cost of ownership (TCO) may be reduced.

The effects of the embodiments of the present invention are not limited to the above-described effects and other effects which are not described herein may be readily understood by those skilled in the art from the appended claims.

Although the preferred embodiments of the present invention have been disclosed for illustrative purposes, those skilled in the art will appreciate that various modifications, additions, and substitutions are possible, without departing from the scope and spirit of embodiments of the invention as disclosed in the accompanying claims.

What is claimed is:

1. A connecting joint comprising:

a base panel;

a plurality of sub-panels sequentially connected to sides of the base panel, respectively, the sub-panels configured to be inwardly bent with reference to the base panel to be assembled, wherein, in an assembled state, the sub-panels are configured to hold a connecting member for connection to the sub-panels;

a plurality of connecting members, wherein the connecting members are held in multi-axial directions on the sub-panels in the assembled state, and wherein the connecting members extend in a longitudinal direction, a width direction, and a vertical direction of a vehicle, respectively; and a joint cover configured to cover the sub-panels and the connecting members.

2. The connecting joint according to claim 1, further comprising bending lines at points where adjacent ones of the sub-panels are interconnected and at points where the sub-panels are connected to the base panel, wherein the sub-panels are configured to be bent along the bending lines to be assembled.

3. The connecting joint according to claim 2, further comprising a plurality of through holes perforated at each of the bending lines, wherein the sub-panels are bent along through holes of the bending lines to be assembled.

4. The connecting joint according to claim 1, wherein the sub-panels are tack-welded at corner points where adjacent ones of the sub-panels abut each other in a state of being inwardly bent with reference to the base panel to be assembled.

5. The connecting joint according to claim 1, wherein, in a state in which the connecting members are held in the multi-axial directions on the sub-panels in the assembled state, ends of the connecting members are interconnected while surface-contacting each other.

6. The connecting joint according to claim 1, wherein, in a state in which the connecting members are held in the multi-axial directions on the sub-panels in the assembled state, each of the connecting members is coupled to a corresponding one of the sub-panels through welding at points where the connecting member contacts the corresponding sub-panel to be fixed.

7. The connecting joint according to claim 1, wherein the joint cover comprises second bending lines and is configured to be bent along the second bending lines to be assembled.

8. The connecting joint according to claim 1, wherein:

an opening is defined at a side of the sub-panels in the assembled state of the sub-panels; and the connecting members are held so as to close the opening.

9. The connecting joint according to claim 1, wherein, in a state in which the connecting members are held in the multi-axial directions on the sub-panels in the assembled state, a side surface of each of the connecting members is supported by one of the sub-panels, respectively.

10. A vehicle comprising:

a vehicle body comprising a connecting joint, the connecting joint comprising:

a base panel;

a plurality of sub-panels sequentially connected to sides of the base panel and inwardly bent with reference to the base panel to define a sub-panel assembly, wherein the sub-panels are connected by welds at corner points where adjacent ones of the sub-panels abut each other in the sub-panel assembly;

a plurality of connecting members held in multi-axial directions on the sub-panel assembly, wherein the connecting members extend in a longitudinal direction, a width direction, and a vertical direction of the vehicle, respectively; and a joint cover covering the sub-panels and the connecting members.

11. The vehicle according to claim 10, wherein ends of the connecting members held on the sub-panel assembly are interconnected while surface-contacting each other.

12. The vehicle according to claim 10, wherein the connecting members are coupled to corresponding ones of the sub-panels by welds at points where the connecting members contact the corresponding ones of the sub-panels.

13. The vehicle according to claim 10, wherein the connecting joint further comprises bending lines at points where adjacent ones of the sub-panels are interconnected and at points where the sub-panels are connected to the base panel.

14. The vehicle according to claim 13, further comprising a plurality of through holes perforated at each of the bending lines.

15. The vehicle according to claim 10, wherein the connecting members comprise a first connecting member extending in the longitudinal direction, a second connecting member extending in the width direction, and a third connecting member extending in the vertical direction.

16. The vehicle according to claim 10, wherein the joint cover is configured to be bent along second bending lines.

17. The vehicle according to claim 10, wherein the connecting members have a rectangular cross-section.

18. The vehicle according to claim 10, wherein the base panel and the plurality of sub-panels are formed from a single sheet of material.

19. A connecting joint comprising:

a base panel;

a plurality of sub-panels sequentially connected to sides of the base panel, respectively, the sub-panels configured to be inwardly bent with reference to the base panel to be assembled, wherein, in an assembled state, the sub-panels are configured to hold a connecting member for connection to the sub-panels;

bending lines at points where adjacent ones of the sub-panels are interconnected and at points where the sub-panels are connected to the base panel, wherein the sub-panels are configured to be bent along the bending lines to be assembled;

a plurality of through holes perforated at each of the bending lines, wherein the sub-panels are bent along the through holes of the bending lines to be assembled;

a plurality of connecting members, wherein the connecting members are held in multi-axial directions on the sub-panels in the assembled state, wherein the connecting members extend in a longitudinal direction, a width direction, and a vertical direction of a vehicle, respectively, and wherein the sub-panels are tack-welded at corner points where adjacent ones of the sub-panels abut each other in a state of being inwardly bent with reference to the base panel; and a joint cover configured to cover the sub-panels and the connecting members.

20. The connecting joint of claim 19, wherein the connecting members are coupled to corresponding ones of the sub-panels through welding, and the connecting members contact the sub-panels through welding at points where the connecting member contacts the sub-panels.

* * * * *